United States Patent [19]

Mahany et al.

[11] 4,312,236

[45] Jan. 26, 1982

[54] VORTEX GENERATING DEVICE

[75] Inventors: Richard J. Mahany; Archie G. Johnson, both of Cedar Rapids, Iowa

[73] Assignee: J-Tec Associates, Inc., Cedar Rapids, Iowa

[21] Appl. No.: 108,066

[22] Filed: Dec. 28, 1979

[51] Int. Cl.³ .............................................. G01F 1/32
[52] U.S. Cl. ............................................... 73/861.22
[58] Field of Search ............ 73/861.22, 861.23, 861.24

[56] References Cited

U.S. PATENT DOCUMENTS 3,759,096 9/1973 White .

FOREIGN PATENT DOCUMENTS 823684 11/1959 United Kingdom ............. 73/861.24

OTHER PUBLICATIONS

Bearman, "Investigation of the Flow Behind a Two-Dimensional Model with Blunt Trailing Edge & Fitted with Splitterplate", in Journal of Fluid Mechanics (1965), vol. 2, Part 2, pp. 241–255.

Vennard, *Elementary Fluid Mechanics*, 3rd Edition (1934), Pub. by Wiley & Sons, pp. 343–349.

*Primary Examiner*—Herbert Goldstein
*Attorney, Agent, or Firm*—Griffin, Branigan & Butler

[57] ABSTRACT

A narrow generator plate (10) is immersed parallel to the direction of flow of a fluid stream (14) for generating Karman vortices. In its various embodiments the generator plate (10) is provided with surface disruption (52) for generating boundary-layer turbulence in the fluid stream in order to eliminate the occurrence of a boundary-layer transition region which would otherwise occur for a range of fluid flow velocities of interest.

5 Claims, 4 Drawing Figures

VORTEX GENERATING DEVICE

BACKGROUND

Embodiments of the invention hereinafter described pertain to devices for the generation of Karman vortices.

Copending U.S. patent application Ser. No. 108,196 entitled Vortex Generating Device is filed on even date herewith, is commonly assigned, and is incorporated herein by reference. That copending application discloses various embodiments of vortex generating devices comprising a narrow generator plate immersed so that its axis of elongation is parallel to the direction of flow of a fluid stream. When fluid flow occurs over a smooth flat plate, such as the generator plate of the above-referenced copending application, viscosity causes the fluid velocity to be zero at points along the surface of the plate. However, at a very slight distance away from the surface of the plate the fluid velocity approaches a velocity generally characteristic of the fluid stream. Hence, a thin layer of fluid, known as the boundary-layer, containing large velocity gradients forms over the surface of the immersed plate.

The boundary layer initially starts at practically no thickness at a leading edge of the flat plate (defined with reference to the direction of fluid flow). Near the leading edge the flow of the boundary layer is essentially laminar. The boundary layer increases in thickness in a downstream direction as the viscous action increases due to increasing plate area. However, as the boundary layer becomes thicker and includes more fluid mass, instability results and flow within the layer breaks down, or "shears off", into turbulent flow. This change from a laminar to a turbulent boundary layer is not an abrupt change, but rather occurs through a boundary-layer transition region in which both viscous and turbulent action are present. Eventually the viscosity effects in the transition region are finally replaced by turbulent effects, and a wholly turbulent boundary layer results.

The particular points along the surface of the flat plate where the transition region occurs are related to a well-known parameter referred to as the Reynold's number. In this regard, the Reynold's number at any particular point downstream from the leading edge of the plate is dependent upon both the velocity of the fluid and the distance of that point from the leading edge. It has generally been observed that the transition region occurs for flat plates in a neighborhood approximating a Reynold's number of $10^5$. Thus, points along the surface of a flat plate having a Reynold's number in this neighborhood will generally be in the boundary-layer transition region.

The location of the boundary-layer transition region is not necessarily constant. That is, while a given flat plate may have a transition region associated with a first range of surface points for one velocity of fluid flow, the transition region may shift so as to become associated with a second range of surface points for a second velocity of fluid flow.

Regardless of where a boundary-layer transition region is located along the flat plate immersed in the stream of fluid flow, the transition region is attended by an erratic frictional drag. This frictional drag has a significant and, owing to its erratic nature, a generally unpredictable impact upon the fluid flow velocity in the transition region.

From the foregoing it is apparent that if a boundary-layer transition region were to occur near a sensing or shedding region of a device such as a vortex flowmeter, the erratic frictional drag would greatly disturb the rate and/or pattern of vortex formation with the result that measurements based thereon would be highly inaccurate. For example, if the structure of any particular vortex generating device were such that the boundary-layer transition region developed near a sensing region or shedding of the flowmeter for any fluid flow velocity of interest for a particular environment, the flowmeter measurements for that fluid velocity would be inaccurate.

Therefore, an object of embodiments of this invention is to provide a vortex generating device capable of producing a stable vortex street throughout a range of fluid flow velocities of interest for a given environment. Such embodiments advantageously eliminate the occurrence of the boundary-layer transition region at significant locations along the generating device where they would otherwise occur for the range of fluid flow velocities of interest.

SUMMARY

In accordance with the principles of this invention, numerous structural embodiments are provided for the generation of Karman vortices. A vortex generating device includes a narrow generator plate which is immersed in a fluid flow and oriented so that its axis of elongation is parallel to the direction of flow of the fluid stream. The generator plate has side surfaces essentially parallel to the direction of fluid flow. The side surfaces are provided with at least one surface disruption, or discontinuity, for generating boundary-layer turbulence in the fluid stream in order to eliminate the occurrence of a boundary layer transition region which might otherwise occur. In one embodiment the surface disruption is a radiused slot.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
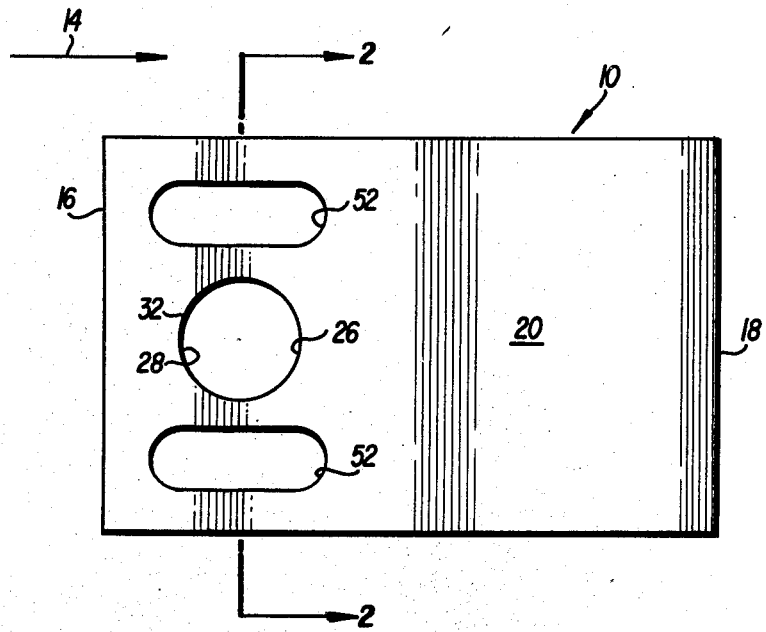
FIG. 1 is a side view of a vortex generating device according to one embodiment of the invention.

FIG. 1 illustrates a representative configuration of a vortex generating device which could, in its various embodiments, selectively comprise any of the numerous embodiments of copending U.S. patent application Ser. No. 108,196 already incorporated herein by reference. As in the copending referenced application, the vortex generating device comprises a generator plate 10 having an axis of elongation (not illustrated) oriented parallel to the direction of fluid flow as indicated by arrow 14 (from left to right). With respect to the direction of flow, the generator plate 10 has a leading edge 16 and a trailing edge 18. The generator plate 10 has two side surfaces 20 which extend from the leading edge 16 to the trailing edge 18. Although the side surfaces 20 are predominantly parallel to the direction of fluid flow, the side surfaces 20 include leading portions and trailing portions not specifically illustrated herein but illustrated in various alternative embodiments of the copending referenced application.

The generator plate 10 has a shedding section comprising an aperture 26 which, although illustrated as a circle in FIG. 1, may take on numerous geometrical shapes as exemplified by numerous embodiments of the copending referenced application. The aperture 26 has a leading aperture edge 28 which intersects the side surfaces 20 of the plate 10 to form shedding corners 32.

The sides surfaces 20 of the generator plate 10 are provided with at least one surface disruption or surface discontinuity 52. While the surface disruption 52 may take various forms, such as a protuberance (that is, a raised or elevated portion) or a hole, the FIG. 1 illustration depicts the surface disruption as a radiused slot in the side surface 20. In the particular configuration illustrated, the radiused slot is formed in side surface 20 so that its greater dimension is parallel to the direction of fluid flow. For one exemplary configuration of the FIG. 1 embodiment, the radiused slot as a 0.5 inch height dimension and 1.5 inch length dimension relative to an aperture 26 of 1.0 inch diameter.

Figure 2:
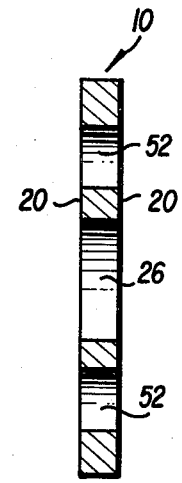
FIG. 2 is a sectional view of the embodiment of FIG. 1 taken along the line 2—2.

In the above regard, a surface disruption such as a hole or slot may be an indentation in the side surface 20 or may, as illustrated in FIG. 2, extend entirely through the width of the plate 10. Further, the surface disruptions may preferably be arranged symmetrically with respect to the aperture 26.

Figure 3:
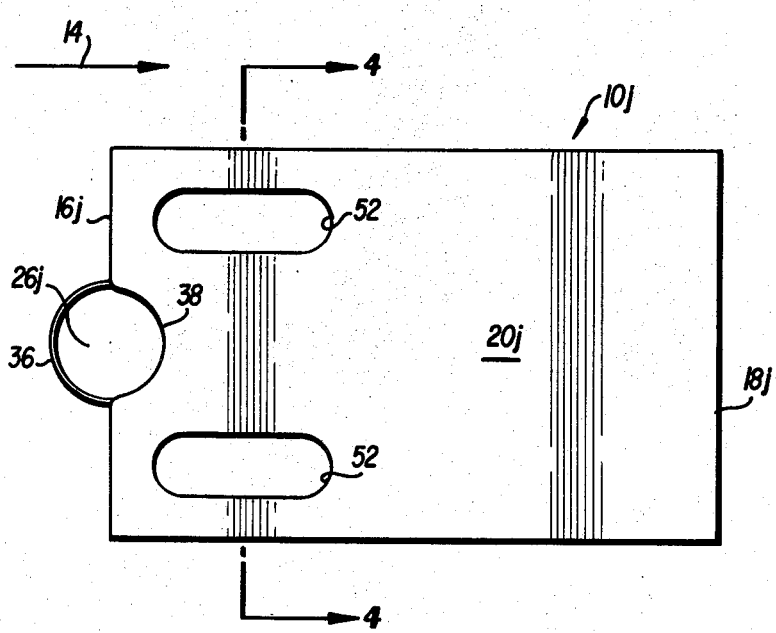
FIG. 3 is a side view of a vortex generating device according to another embodiment of the invention; and, FIG. 4 is a sectional view of the embodiment of FIG. 3 taken along the line 4—4.
Figure 4:
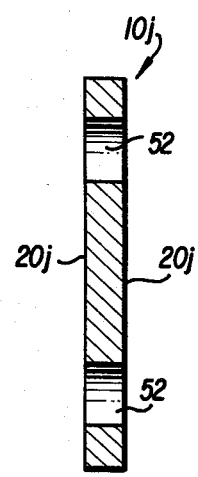

FIG. 3 illustrates a further embodiment of the invention comprising embodiments which resemble FIGS. 4A and 4B of the copending referenced application. In FIG. 3 a generator plate 10j has side surfaces 20j spanning a leading edge 16j and a trailing edge 18j. A generator member 36, preferably a wire, is mounted on the leading edge 16j of the generator plate 10j so as to extend upstream along the axis of elongation. The member 36 is preferably arcuate so as to be attached to leading edge 16j at two points. However, it should again be understood that member 36 may assume various geometrical configurations, including that of a substantially linear element.

When the leading edge 16j is formed with a dimple 38 as shown in FIG. 3, the arcuate member 36 and dimple 38 circumscribe an aperture 26j of which the generator member 36 is a leading aperture edge and the dimple 38 is a trailing aperture edge.

The generator plate 10j also has provided on its side surfaces 20j at least one surface disruption, or surface discontinuity 52. As with the embodiment of FIG. 1 discussed above, the surface disruption 52 may take several forms. In this regard, FIG. 3 depicts a surface disruption as a radiused slot.

In operation, each of the generator plates 10 according to the different embodiments of the invention is oriented so that its axis of elongation is parallel to the direction of fluid flow as indicated by arrow 14. A boundary layer develops along side surfaces 20 of the generator plate 10 from the leading edge 16 to the trailing edge 18.

Without the surface disruption 52 of the invention and depending on the Reynold's number associated with each point along the side surface 20, the boundary layer would be either laminar, transitional, or turbulent. A wholly laminar or wholly turbulent boundary layer does not deleteriously effect the vortex street created by the shedding corners 32 of the FIG. 1 embodiment or the generator member 36 of the FIG. 3 embodiment (the copending referenced application describes the production of vortices for the respective embodiments). However, if a boundary-layer transition region occurs along the side surface 20 the aforedescribed frictional drag has a deleterious and unpredictable impact upon the fluid flow velocity.

The surface discontinuities or surface disruptions 52 on the side surfaces 20 of the generator plate 10 generate boundary-layer turbulence which eliminates the formation of a boundary-layer transition region and permits the velocity profile of the flow to develop without further disturbances. With the provision of the surface discontinuities 52 the boundary layer does not shear off from the plate so as to effect the vortex shedding sections of the respective embodiments.

Incorporation of a vortex generating element according to the embodiments of this invention into a vortex flowmeter results in a vortex generating device capable of producing a stable vortex street throughout a range of fluid flow velocities of interest for the given flowmeter environment. Thus, the measurements based on the vortices generated by the device disclosed herein are highly accurate through a broad range of fluid flow velocities.

While the invention has been particularly shown and described with reference to the preferred embodiments thereof, it will be understood by those skilled in the art that various alterations in form and detail may be made therein without departing from the spirit and scope of the invention. For example, embodiments of the invention may selectively take on various features of the copending referenced application, such as the various alternative geometrical shapes for the aperture 26 and the leading edges and trailing edges 16 and 18, respectively.

The embodiments of the invention in which an exclusive property or privilege is claimed are defined as follows:

1. A device for generating Karman vortices in a fluid stream, said device comprising:
 a narrow elongate plate member having an axis of elongation parallel to the direction of flow of said fluid stream, said elongate plate member having side surfaces essentially parallel to said direction flow, said elongate plate member also having at least one aperture, wherein said aperture intersects at least one said side surface to form at said side surface a leading aperture edge with respect to said direction of flow such that said leading aperture edge forms a shedding corner for the generation of vortices; and wherein said side surfaces of said elongate plate member are provided with at least one surface disruption for generating boundary-layer turbulence in the fluid stream.

2. A device for generating Karman vortices in a fluid stream, said device comprising:
 a narrow elongate plate member having an axis of elongation parallel to the direction of flow of said fluid stream, said elongate plate member having side surfaces essentially parallel to said direction of flow, wherein said side surface of said plate member have leading portions thereof with respect to said direction of flow, wherein said leading portions of said side surfaces intersect so as to form a leading edge of said plate member, wherein said leading portions of said plate member intersect so as to form an essentially sharp leading edge of said plate, wherein said leading portions of said side surfaces gradually taper inwardly to said leading edge, and wherein said surfaces of said elongate plate member are provided with at least one surface disruption for generating boundary-layer turbulence in the fluid stream; and, a generator member connected to at least one point of said leading edge of said plate member and oriented upstream with respect to said direction of flow for the generation of Kareman vortices.

3. The device of claims 1 or 2, wherein said side surface disruption is a hole.

4. The device of claims 1 or 2, wherein said side surface disruption is a radiused slot.

5. The device of claims 1 or 2, wherein said surface disruption is a protuberance.

* * * * *